United States Patent [19]

Isley

[11] Patent Number: 4,899,931

[45] Date of Patent: Feb. 13, 1990

[54] GOLF CART HEATER

[76] Inventor: Richard W. Isley, 1204 W. 19th Pl., Kennewick, Wash. 99337

[21] Appl. No.: 389,686

[22] Filed: Aug. 4, 1989

[51] Int. Cl.⁴ .............................................. B60H 1/02
[52] U.S. Cl. .......................... 237/12.3 C; 126/350 A
[58] Field of Search ..................... 237/12.3 C, 12.3 R, 237/12.3 A; 126/350 A

[56] References Cited

U.S. PATENT DOCUMENTS

| | | | |
|---|---|---|---|
| 1,871,008 | 8/1932 | Rentz | 126/350 A |
| 2,021,569 | 11/1935 | Pasco | 237/12.3 C |
| 4,513,911 | 4/1985 | Sanchez | 237/12.3 C |

Primary Examiner—Henry A. Bennet
Attorney, Agent, or Firm—Frank J. Dykas; Craig M. Korfanta

[57] ABSTRACT

Golf cart heater (10) has golf cart adapter bracket (15) secured to the dash (2) or a front panel within the cab of golf cart (1). Golf cart adapter bracket (15) generally has a front planar member (16) including a arcuate cutout (17) for receiving a propane bottle (12). A gas fuel burning heating element (11) is rigidly secured within heating element cutout (17). A generally planar base panel (20) is angularly attached along a bottom edge of front panel (16) and provides a convenient mounting surface for the golf cart heater (10). A bottle retaining member (21) is attached to the back edge of base panel (20) and extends angularly upward therefrom, generally coaxial with carcuate cutout (17) to provide a bottle retaining structure.

3 Claims, 2 Drawing Sheets

GOLF CART HEATER

BACKGROUND OF THE INVENTION

1. Technical Field

This invention generally relates to self-contained gas burning heaters and in particular it relates to a self-contained gas burning heater specifically adapted for use on a golf cart.

2. Background Art

Cold weather golfing is becoming more and more popular. Depending upon the geography and climatic conditions, golf can be played all year around. However, in particularly cold climates, because of the nature of the game, it is undesirable to wear heavy winter clothing, e.g. a ski parka and ski gloves, as they severely limit the flexibility of the golfer. The cold weather golfer is forced to wear fairly light clothing and therefor from time to time needs to get out of the cold.

Heretofore, the solution has been to rig up a commercially available portable propane heater in the golf cart. The problem is that none of them are specifically adapted for use in golf carts and consequently are bulky, space consumptive, and dangerous.

U.S. Pat. No. 4,513,911 to Sanchez discloses an auxiliary vehicle space heater. The auxiliary vehicle space heater taught by Sanchez uses a portable fuel source such as a propane bottle and a suitable burner is connection with a heat exchanger to provide a convection heat source to the interior of a closed vehicle. Sanchez further teaches the use of an electric fan to aid in the circulation of heated air. Unfortunately, the apparatus of Sanchez is specifically adapted for use in an automobile as opposed to a golf cart. Because a golf cart is typically open to the environment, that is it does not have a sealed cab as does an automobile, the heat exchanger unnecessarily complicates the apparatus. Additionally, the use of a forced air fan would require an electrical hookup to the golf cart's electrical system. In the case of an electrically powered golf cart, this puts an additional strain on the already relatively low duty cycle batteries. Even if the above considerations could somehow be overcome, the amount of available space in a golf cart is severely limited and there is no place or way to mount the device of Sanchez.

What is needed is a portable fuel type heater which is specifically designed to be attached within the compartment of a golf cart. Accordingly, it is an object of the present invention to provide such a heater.

DISCLOSURE OF INVENTION

This, and other objects, are attained by a golf cart heater which includes a gas fuel burning heating element, a portable gas reservoir, or fuel source, such as a propane bottle, and a golf cart adapter bracket for holding the propane bottle and heating element securely within the compartment of a golf cart.

The golf cart heater has the golf cart adapter bracket secured to the dash or a front panel within the cab of the golf cart. The gold cart adapter bracket generally has a front planar member including a arcuate cutout for receiving a propane bottle. The gas fuel burning heating element is rigidly secured within a heating element cutout within the front panel. The generally planar base panel is angularly attached along the bottom edge of the front panel and provides a convenient mounting surface for the golf cart heater. A bottle retaining member is attached to the back edge of the base panel and extends angularly upward therefrom. The bottle retaining member is disposed along the back edge generally coaxial with the arcuate cutout to provide a bottle retaining structure. The propane bottle is then attached to the heating element via a standard regulator and supply hose.

BEST MODE FOR CARRYING OUT INVENTION

Figure 1:
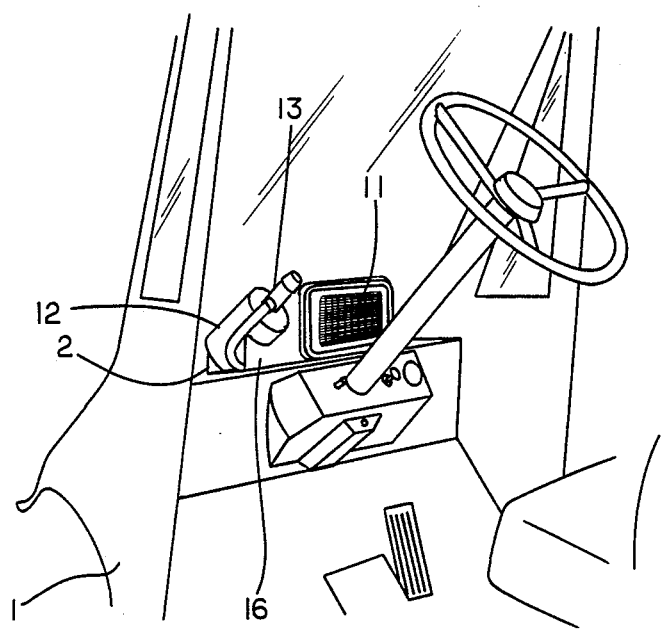
FIG. 1 is a elevation view of a golf car heater installed in a golf cart.
Figure 2:
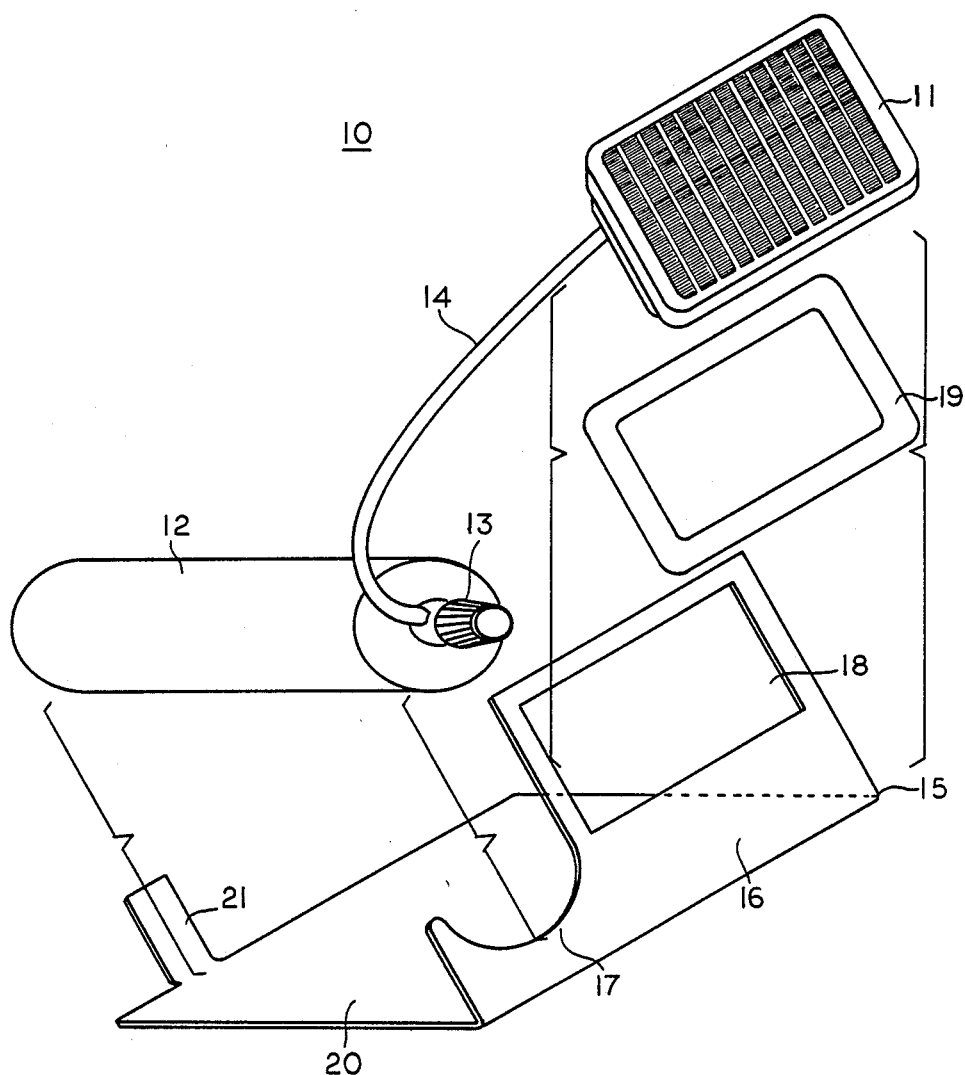
FIG. 2 is a partially exploded elevation view of the golf cart heater.

Referring now to the figures, golf cart heater 10 is shown installed on top of dash board 2 of golf cart 1. Golf cart heater 10 generally has a gas burning catalytic heater element 11 securely attached to golf cart adapter bracket 15, which in turn is securely attached to dash board 2. Gas burning heater element 11 is here a catalytic heater element although it could just as easily be any suitable type burner. Heater element 11 is supplied with a suitable gas fuel from a reservoir such as propane bottle 12, via regulator 13 and supply hose 14. Propane bottle, 12 is removably held within golf cart adapter bracket 15 using arcuate bottle receiving cutout 17 and bottle retaining member 21.

Golf cart adapter bracket 15 is here constructed from a relatively light gauge sheet metal. It should be apparent that it could also be constructed from other suitable materials such as heat resistant plastic or the like. Golf cart adapter bracket 15 has a generally planar front panel 16 angularly extending from, and being secured along its bottom edge to, the front edge of generally planar base panel 20. Front panel 16 includes a suitable shaped heater element cutout 18 for receiving heater element 11. A heat shield gasket 19 is provided between front panel 16 and heater element 11 to thermally insulate golf cart adapter bracket 15 from heater element 11. Heater element 11 is typically secured to front panel 16 via a suitable sheet metal screw which is not shown.

Arcuate bottle receiving cutout 17 is provided within front panel 16 and is shaped to receive and cradle propane bottle 12. Bottle retaining member 12 is angularly attached to the rear edge of base panel 20 to extend upwardly therefrom. Advantageously bottle retaining member 21 is axially aligned with arcuate bottle receiving cutout 17 and disposed to abut the base of propane bottle 12.

In use, the golfer inserts a propane bottle into arcuate bottle receiving cutout 17 and slides the bottle toward the back edge of base panel 20 until it abuts bottle retaining member 21. Regulator 13 is then attached to the threaded end of propane bottle 12. Supply hose 14 connects regulator 13 to heater element 11. The golfer then adjusts regulator 13 and lights heater element 11 using a suitable ignition source such as a match. Once the propane fuel has been expended, the golfer can simply replace it with a fresh bottle.

While there is shown and described the present preferred embodiment of the invention, it is to be distinctly understood that this invention is not limited thereto but may be variously embodied to practice within the scope of the following claims.

What is claimed:

1. A golf cart heater which comprises:
a gas fuel burning heating element;

a gas reservoir being operatively attached to said heating element for supplying the same with fuel; and a golf cart adapter bracket being securely attached to a golf cart and having said heating element attached thereto, said adapter bracket further having means for removably attaching said gas reservoir.

2. The apparatus of claim No. 1 wherein said adapter bracket comprises:

a front panel having said heating element attached thereto;

a base panel being attached along an edge of said front panel and being disposed angularly with respect thereto; and a bottle retaining member being attached to said base panel and being disposed angularly with respect to said base panel for retaining a gas reservoir.

3. The apparatus of claimNo. 2 wherein said front panel has a generally arcuate cutout for receiving said gas reservoir.

* * * * *